United States Patent
Chae et al.

(10) Patent No.: US 12,113,203 B2
(45) Date of Patent: Oct. 8, 2024

(54) NEGATIVE ELECTRODE FOR LITHIUM SECONDARY BATTERY, METHOD FOR PRE-LITHIATION THEREOF, AND LITHIUM SECONDARY BATTERY INCLUDING SAME

(71) Applicant: LG CHEM, LTD., Seoul (KR)

(72) Inventors: Oh Byong Chae, Daejeon (KR); Sang Wook Woo, Daejeon (KR); Ye Ri Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 848 days.

(21) Appl. No.: 17/254,516

(22) PCT Filed: Jul. 4, 2019

(86) PCT No.: PCT/KR2019/008196
§ 371 (c)(1),
(2) Date: Dec. 21, 2020

(87) PCT Pub. No.: WO2020/009494
PCT Pub. Date: Jan. 9, 2020

(65) Prior Publication Data
US 2021/0218016 A1    Jul. 15, 2021

(30) Foreign Application Priority Data
Jul. 6, 2018    (KR) .................. 10-2018-0078681

(51) Int. Cl.
*H01M 4/1395* (2010.01)
*H01M 4/04* (2006.01)
(Continued)

(52) U.S. Cl.
CPC ....... *H01M 4/1395* (2013.01); *H01M 4/0445* (2013.01); *H01M 4/0469* (2013.01);
(Continued)

(58) Field of Classification Search
None
See application file for complete search history.

(56) References Cited

U.S. PATENT DOCUMENTS

| 9,385,397 B2 | 7/2016 | Zhamu et al. |
| 2005/0266304 A1 | 12/2005 | Honda et al. |

(Continued)

FOREIGN PATENT DOCUMENTS

| CN | 1957489 A | 5/2007 |
| CN | 101145621 A | 3/2008 |

(Continued)

OTHER PUBLICATIONS

Extended European Search Report for European Application No. 19829905.9, dated Jul. 12, 2021.
(Continued)

*Primary Examiner* — Laura Weiner
(74) *Attorney, Agent, or Firm* — Birch, Stewart, Kolasch & Birch, LLP

(57) ABSTRACT

A negative electrode for a lithium secondary battery, a negative electrode in which the negative electrode is pre-lithiated, a method of manufacturing the negative electrode, and a lithium secondary battery including the negative electrode. The pre-lithiated negative electrode may increase the capacity and improve the electrochemical performance of a lithium secondary battery by securing the initial reversibility of a negative electrode.

11 Claims, 2 Drawing Sheets

(51) Int. Cl.

| | | |
|---|---|---|
| *H01M 4/133* | (2010.01) | |
| *H01M 4/134* | (2010.01) | |
| *H01M 4/1393* | (2010.01) | |
| *H01M 4/36* | (2006.01) | |
| *H01M 4/38* | (2006.01) | |
| *H01M 4/485* | (2010.01) | |
| *H01M 4/58* | (2010.01) | |
| *H01M 10/04* | (2006.01) | |
| *H01M 10/0525* | (2010.01) | |
| *H01M 10/058* | (2010.01) | |
| *H01M 4/02* | (2006.01) | |

(52) U.S. Cl.
CPC ........... *H01M 4/133* (2013.01); *H01M 4/134* (2013.01); *H01M 4/1393* (2013.01); *H01M 4/364* (2013.01); *H01M 4/366* (2013.01); *H01M 4/382* (2013.01); *H01M 4/485* (2013.01); *H01M 4/58* (2013.01); *H01M 10/049* (2013.01); *H01M 10/0525* (2013.01); *H01M 10/058* (2013.01); *H01M 2004/027* (2013.01)

(56) References Cited

U.S. PATENT DOCUMENTS

| | | |
|---|---|---|
| 2008/0070120 A1 | 3/2008 | Miyawaki et al. |
| 2008/0311477 A1 | 12/2008 | Salot et al. |
| 2012/0105007 A1 | 5/2012 | Amiruddin et al. |
| 2012/0107680 A1 | 5/2012 | Amiruddin et al. |
| 2014/0272584 A1 | 9/2014 | Jiang et al. |
| 2014/0356723 A1 | 12/2014 | Suehiro et al. |
| 2016/0141596 A1 | 5/2016 | Uhm et al. |
| 2016/0204428 A1 | 7/2016 | Sugawara |
| 2016/0293944 A1 | 10/2016 | Yoon et al. |
| 2017/0012282 A1 | 1/2017 | Kondo et al. |
| 2017/0084910 A1 | 3/2017 | Ichikawa et al. |
| 2018/0198118 A1 | 7/2018 | Amiruddin et al. |
| 2020/0403230 A1 | 12/2020 | Hong et al. |
| 2021/0242457 A1* | 8/2021 | Hong ................... H01M 4/382 |

FOREIGN PATENT DOCUMENTS

| | | |
|---|---|---|
| CN | 102709592 A | 10/2012 |
| CN | 202616342 U | 12/2012 |
| CN | 202633454 U | 12/2012 |
| CN | 103918107 A | 7/2014 |
| CN | 105637692 A | 6/2016 |
| CN | 106030862 A | 10/2016 |
| CN | 107565117 A | 1/2018 |
| CN | 107863497 A | 3/2018 |
| JP | 2005-38720 A | 2/2005 |
| JP | 2012-9209 A | 1/2012 |
| JP | 2014-44921 A | 3/2014 |
| JP | 2015-18663 A | 1/2015 |
| JP | 2015-69712 A | 4/2015 |
| JP | 2017-107886 A | 6/2017 |
| KR | 10-2007-0043802 A | 4/2007 |
| KR | 10-2008-0025002 A | 3/2008 |
| KR | 10-2013-0108620 A | 10/2013 |
| KR | 10-2014-0032577 A | 3/2014 |
| KR | 10-2014-0046496 A | 4/2014 |
| WO | 2015/016482 A1 | 2/2015 |
| WO | WO 2019/103488 A1 | 5/2019 |

OTHER PUBLICATIONS

International Search Report (PCT/ISA/210) issued in PCT/KR2019/008196 mailed on Oct. 10, 2019.

* cited by examiner

[FIG. 1]
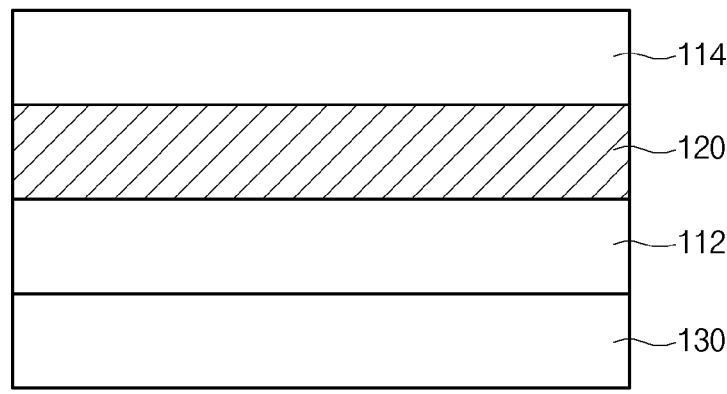
[FIG. 2]
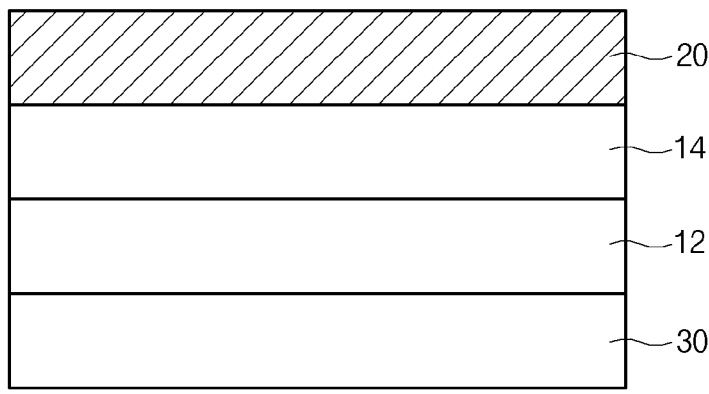
[FIG. 3]
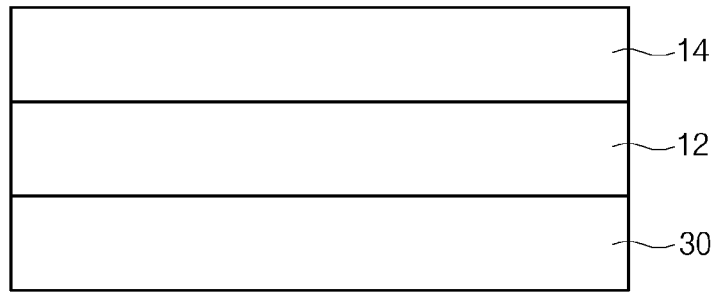

[FIG. 4]
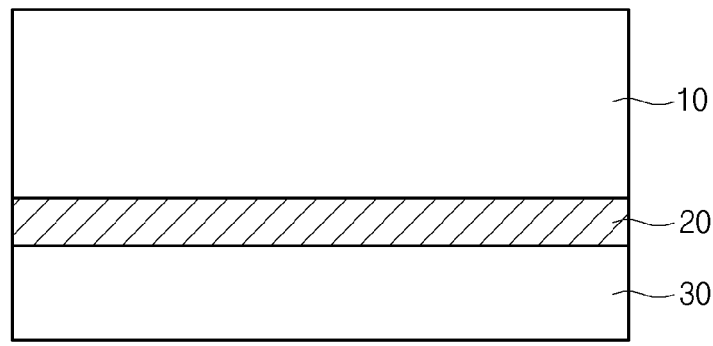
[FIG. 5]
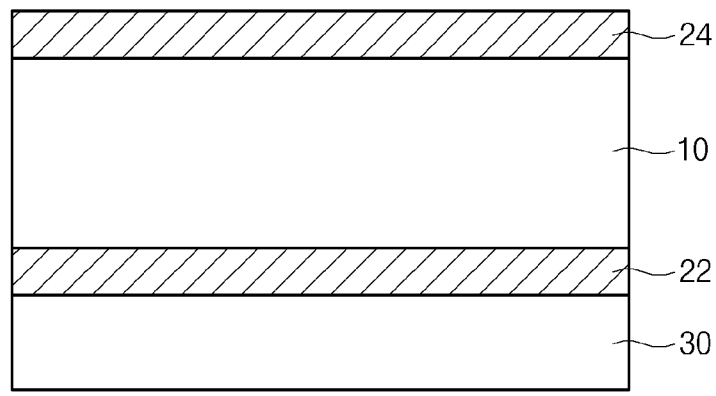
[FIG. 6]
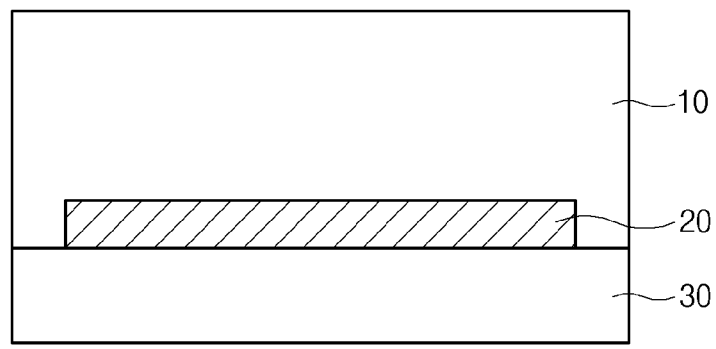

NEGATIVE ELECTRODE FOR LITHIUM SECONDARY BATTERY, METHOD FOR PRE-LITHIATION THEREOF, AND LITHIUM SECONDARY BATTERY INCLUDING SAME

CROSS-REFERENCE TO RELATED APPLICATION

This application claims priority to and the benefit of Korean Patent Application No. 10-2018-0078681, filed on Jul. 6, 2018, the disclosure of which is incorporated herein by reference in its entirety.

TECHNICAL FIELD

The present invention relates to a negative electrode for a lithium secondary battery, a method for pre-lithiation of the negative electrode, a lithium secondary battery manufactured using the negative electrode, and a method of manufacturing a lithium secondary battery. Specifically, the present invention relates to a negative electrode for a lithium secondary battery capable of increasing the capacity of the battery and improving electrochemical performance by securing the initial reversibility of the negative electrode by pre-lithiation, and allowing more lithium ions to be diffused into a negative electrode active material layer during pre-lithiation, a method for pre-lithiation of the negative electrode, and a lithium secondary battery manufactured using the negative electrode.

BACKGROUND ART

As the technical development of and the demand on mobile devices increase, demand for secondary batteries as energy sources is rapidly increasing, and among these secondary batteries, lithium secondary batteries that have high energy density, a high operating voltage, a long cycle lifespan, and a low self-discharge rate are commercially available and widely used.

Meanwhile, a metal oxide such as $LiCoO_2$, $LiMnO_2$, $LiMn_2O_4$, or $LiCrO_2$ is used as a positive electrode active material constituting a positive electrode of a lithium secondary battery, and a material such as metal lithium, a carbon-based material, for example, graphite or activated carbon, or silicon oxide ($SiO_x$) is used as a negative electrode active material constituting a negative electrode. Among the materials used as the negative electrode active material, metal lithium was mainly used initially, but as the charge and discharge cycles progress, lithium atoms grow on the surface of the metal lithium to damage a separator and damage a battery, and thus, recently, a carbon-based material is generally used. However, since the carbon-based material has a disadvantage in that a theoretical capacity is only about 400 mAh/g and thus capacity is small, various studies have been made to replace the carbon-based material with a silicon (Si)-based material having a high theoretical capacity (4,200 mAh/g) as the negative electrode active material.

The lithium secondary battery is charged and discharged while lithium ions of a positive electrode active material of a positive electrode are intercalated into and deintercalated from a negative electrode active material of a negative electrode.

Theoretically, intercalation and deintercalation reactions of lithium into and from a negative electrode active material are completely reversible, but in practice, more lithium is consumed than the theoretical capacity of the negative electrode active material, and only a part of the lithium is recovered during discharging. Accordingly, from the second cycle, a smaller amount of lithium ions are intercalated during charging while most of the intercalated lithium ions are deintercalated during discharging. As described above, the difference in capacity that occurs in the reactions during the first charging and discharging is called an irreversible capacity loss, and since commercialized lithium secondary batteries are manufactured in a state in which lithium ions are supplied only from a positive electrode and lithium is not present in a negative electrode, it is important to minimize the irreversible capacity loss in initial charging and discharging.

Such an initial irreversible capacity loss is known to be caused mainly by an electrolyte decomposition reaction on the surface of the negative electrode active material, and a solid electrolyte interface (SEI) film is formed on the surface of the negative electrode active material by an electrochemical reaction through electrolyte decomposition. Such formation of the SEI film has a problem of causing an irreversible capacity loss because a large amount of lithium ions are consumed, but the SEI film formed at the beginning of charging prevents the reaction of lithium ions with the negative electrode or other materials during charging and discharging, and serves as an ion tunnel to pass only lithium ions, thereby further suppressing the electrolyte decomposition reaction and contributing to the improvement of cycle characteristics of a lithium secondary battery.

Accordingly, there is a need for methods for improving initial irreversibility caused by the formation of the SEI film and the like, and one of the methods is to perform pre-lithiation before manufacturing a lithium secondary battery so that side reactions that occur during the first charging are experienced in advance. As described above, in the case in which pre-lithiation is performed, when charging and discharging are performed on an actually manufactured secondary battery, there is an advantage that the initial irreversibility can be reduced because the first cycle proceeds in a state in which irreversibility is reduced.

The conventional pre-lithiation method may include, for example, a method of depositing lithium on the negative electrode and a method of directly contacting the lithium with the negative electrode. For example, a lithiated material layer may be formed on a negative electrode active material layer for pre-lithiation, however, the lithiated material is vulnerable to oxidation and may be easily oxidized when exposed to moisture or oxygen.

Accordingly, there is a demand for the development of a new negative electrode for a lithium secondary battery capable of achieving more effective pre-lithiation.

PRIOR ART DOCUMENT

[Patent Document]
KR2008-0025002 A

DISCLOSURE

Technical Problem

The present invention is directed to providing a negative electrode for a lithium secondary battery in which the initial reversibility of the negative electrode may be secured and simultaneously lithium ions may be sufficiently diffused into a negative electrode active material during pre-lithiation, a method for pre-lithiation of the negative electrode, and a lithium secondary battery manufactured using the negative electrode.

Technical Solution

One aspect of the present invention provides a negative electrode for a lithium secondary battery including: a first negative electrode active material layer on a surface of a negative electrode current collector, wherein the first negative electrode material layer comprises a first negative electrode active material; a lithium metal layer on a surface of the first negative electrode active material layer, wherein the lithium metal layer comprises lithium metal; and a second negative electrode active material layer on a surface of the lithium metal layer, wherein the second negative electrode active material layer comprises a second negative electrode active material.

Another aspect of the present invention provides a negative electrode for a lithium secondary battery, which is manufactured by pre-lithiating the negative electrode and includes: a first negative electrode active material layer formed on a negative electrode current collector and including a first negative electrode active material; and a second negative electrode active material layer formed on the first negative electrode active material layer and including a second negative electrode active material, and the first negative electrode active material layer and the second negative electrode active material layer each include lithium therein.

Still another aspect of the present invention provides a method for pre-lithiation of a negative electrode for a lithium secondary battery, the method including: forming a first negative electrode active material layer on a surface of a negative electrode current collector; forming a lithium metal layer including a lithium metal on a surface of the first negative electrode active material layer; forming a second negative electrode active material layer on a surface of the lithium metal layer; and impregnating the resulting negative electrode for the lithium secondary battery with a pre-lithiation solution to achieve pre-lithiation.

Yet another aspect of the present invention provides a lithium secondary battery manufactured using the negative electrode for a lithium secondary battery of the present invention.

Yet another aspect of the present invention provides a method of manufacturing a lithium secondary battery, the method including: forming a first negative electrode active material layer on a surface of a negative electrode current collector; forming a lithium metal layer including lithium metal on a surface of the first negative electrode active material layer; forming a second negative electrode active material layer on a surface of the lithium metal layer to manufacture a negative electrode for a lithium secondary battery; manufacturing an electrode assembly including the negative electrode, a positive electrode, and a separator and inserting the electrode assembly in a battery case; injecting an electrolyte solution into the battery case; and impregnating the electrode assembly with the electrolyte solution by maintaining the electrode assembly at a temperature of 10° C. to 200° C. for 2 hours to 48 hours.

Yet another aspect of the present invention provides a method of manufacturing a lithium secondary battery, the method including: forming a first negative electrode active material layer on a surface of a negative electrode current collector; forming a lithium metal layer comprising lithium metal on a surface of the first negative electrode active material layer; forming a second negative electrode active material layer on a surface of the lithium metal layer; impregnating the resulting negative electrode with a pre-lithiation solution to manufacture a pre-lithiated negative electrode for a lithium secondary battery; manufacturing an electrode assembly including the negative electrode, a positive electrode, and a separator; inserting the electrode assembly in a battery case; and injecting an electrolyte solution into the battery case.

Advantageous Effects

A negative electrode for a lithium secondary battery of the present invention has a structure in which negative electrode active materials are present above and below a lithium metal layer so that more lithium metal can be consumed in pre-lithiation and residual unreacted lithium metal can be reduced to improve a pre-lithiation effect.

A pre-lithiated negative electrode of the present invention can secure the initial reversibility of the negative electrode to improve the electrochemical performance of a lithium secondary battery.

DESCRIPTION OF DRAWINGS

FIG. 1 is a cross-sectional view illustrating a stacked structure of a negative electrode according to an embodiment of the present invention.

FIG. 2 is a cross-sectional view illustrating a stacked structure of a negative electrode according to Comparative Example 1 of the present invention.

FIG. 3 is a cross-sectional view illustrating a stacked structure of a negative electrode according to Comparative Example 2 of the present invention.

FIG. 4 is a cross-sectional view illustrating a stacked structure of a negative electrode according to Comparative Example 3 of the present invention.

FIG. 5 is a cross-sectional view illustrating a stacked structure of a negative electrode according to Comparative Example 4 of the present invention.

FIG. 6 is a cross-sectional view illustrating a stacked structure of a negative electrode according to Comparative Example 5 of the present invention.

MODES OF THE INVENTION

Hereinafter, the present invention will be described in further detail.

The terms or words used in the present specification and claims should not be construed as being limited to ordinary or dictionary meanings and should be construed as meanings and concepts consistent with the spirit of the present invention based on the principle that an inventor can appropriately define concepts and terms to explain the invention of the inventor in the best way.

Hereinafter, the present invention will be described in further detail.

The terms or words used in the present specification and claims should not be construed as being limited to ordinary or dictionary meanings and should be construed as meanings and concepts consistent with the spirit of the present invention based on the principle that an inventor can appropriately define concepts and terms to explain the invention of the inventor in the best way.

Negative Electrode and Method of Manufacturing the Same

A negative electrode of the present invention and a method for pre-lithiation thereof will be described with reference to the drawings of the present invention.

The negative electrode of the present invention may have the following components before pre-lithiation (see FIG. 1):

a first negative electrode active material layer 112 formed on a negative electrode current collector 130 and including a first negative electrode active material;

a lithium metal layer 120 formed on the first negative electrode active material layer 112 and including lithium metal; and a second negative electrode active material layer 114 formed on the lithium metal layer 120 and including a second negative electrode active material.

The first negative electrode active material and the second negative electrode active material each include silicon (Si), a silicon-based alloy or silicon oxide (SiO$_x$, 0<x≤2) as a silicon-based negative electrode active material.

Specifically, the negative electrode active material may further include a carbon-based negative electrode active material such as artificial graphite, natural graphite, graphitized carbon fiber, and amorphous carbon in addition to the silicon-based negative electrode active material. In this case, the first negative electrode active material layer and the second negative electrode active material layer may each independently include a silicon-based negative electrode active material and a carbon-based negative electrode active material at a weight ratio of 1:99 to 50:50, and preferably 5:95 to 20:80.

When the proportion of the silicon-based negative electrode active material is below the above-described range, it is difficult to increase the energy density of the battery, and thus it is difficult to achieve the high capacity of the battery, and when the proportion of the silicon-based negative electrode active material exceeds the above-described range, the degree of volume expansion of the negative electrode may increase.

The lithium metal layer may be consist of lithium metal powder or a lithium metal foil.

Further, the negative electrode of the present invention is a pre-lithiated negative electrode manufactured by pre-lithiating the negative electrode and includes: a first negative electrode active material layer formed on a negative electrode current collector and including a first negative electrode active material; and a second negative electrode active material layer formed on the first negative electrode active material layer and including a second negative electrode active material, and the first negative electrode active material layer and the second negative electrode active material layer each include lithium therein.

In the negative electrode, lithium in the lithium metal layer moves to the first negative electrode active material layer and the second negative electrode active material layer, which are formed above and below the lithium metal layer, by pre-lithiation, and is diffused in a lithium-ion form or present in a form of being combined with the first negative electrode active material and the second negative electrode active material in the first negative electrode active material layer and the second negative electrode active material layer.

The pre-lithiation method of the present invention for manufacturing a pre-lithiated negative electrode for a lithium secondary battery may include the following operations:

forming a first negative electrode active material layer on a negative electrode current collector;

forming a lithium metal layer including lithium metal on the first negative electrode active material layer;

forming a second negative electrode active material layer on the lithium metal layer; and impregnating the resultant with a pre-lithiation solution to achieve pre-lithiation.

The lithium metal layer may be formed by adding and dispersing lithium metal powder and a binder in an organic solvent and then evenly applying the solution onto the formed first negative electrode active material layer, or by placing and pressing a lithium metal foil on the first negative electrode active material layer.

The pre-lithiation solution is a solution including an ionizable lithium salt and an organic solvent and corresponds to a general electrolyte solution.

The ionizable lithium salt contains Li+ as a cation, and an anion may be selected from the group consisting of F$^-$, Cl$^-$, Br$^-$, I$^-$, NO$_3^-$, N(CN)$_2^-$, BF$_4^-$, ClO$_4^-$, AlO$_4^-$, AlCl$_4^-$, PF$_6^-$, SbF$_6^-$, AsF$_6^-$, B$_{10}$Cl$_{10}^-$, BF$_2$C$_2$O$_4^-$, BC$_4$O$_8^-$, PF$_4$C$_2$O$_4^-$, PF$_2$C$_4$O$_8^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, C$_4$F$_9$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, CH$_3$SO$_3^-$, CF$_3$(CF$_2$)$_7$SO$_3^-$, CF$_3$CO$_2^-$, CH$_3$CO$_2^-$, SCN$^-$, and (CF$_3$CF$_2$SO$_2$)$_2$N$^-$.

The organic solvent may be one or more selected from a cyclic carbonate-based organic solvent selected from the group consisting of ethylene carbonate, 1,2-butylene carbonate, 2,3-butylene carbonate, 1,2-pentylene carbonate, 2,3-pentylene carbonate, vinylene carbonate and fluoroethylene carbonate (FEC); a linear carbonate-based organic solvent selected from the group consisting of dimethyl carbonate, diethyl carbonate, dipropyl carbonate, ethyl methyl carbonate, methyl propyl carbonate, and ethyl propyl carbonate; and a linear ester-based organic solvent selected from the group consisting of methyl acetate, ethyl acetate, propyl acetate, methyl propionate, ethyl propionate, propyl propionate, and butyl propionate.

The impregnating operation is a pre-lithiating operation and may be performed by impregnating a high temperature heat-treated negative electrode active material layer with a pre-lithiation solution at a temperature of 10° C. to 200° C. for 2 to 48 hours, and preferably 20° C. to 70° C. for 2 to 36 hours.

When the pre-lithiation temperature and time are less than 10° C. and less than 2 hours, respectively, pre-lithiation may not be sufficiently achieved, when the pre-lithiation temperature exceeds 200° C., lithium metal may melt and the shape thereof may not be maintained, and since pre-lithiation is sufficiently achieved in 48 hours, there is no need to further impregnate the negative electrode.

Since the negative electrode of the present invention includes the negative electrode active material layers positioned above and below the lithium metal layer, more lithium metal is consumed in pre-lithiation, so that pre-lithiation is sufficiently achieved and the residual unreacted lithium metal may also be reduced to improve a pre-lithiation effect. Accordingly, the electrochemical performance of the lithium secondary battery may be improved by securing the initial reversibility of the negative electrode.

On the contrary, for example, when a negative electrode active material is present only in a layer below a lithium metal layer (see FIG. 2), the lithium metal is not all used in pre-lithiation and remains as unreacted lithium metal because the contact surface between the negative electrode active material and a lithium metal is small, and thus pre-lithiation may not be sufficiently achieved.

Further, pre-lithiation is not sufficiently achieved in cases other than the case in which the negative electrode active material layers surround the lithium metal layer above and below as in the present invention, such as, for example, a case in which a negative electrode active material is present only in a layer above a lithium metal layer (see FIG. 4), a case in which lithium metal layers are present above and below a negative electrode active material (see FIG. 5), and a case in which a lithium metal layer is present in a negative electrode active material layer (see FIG. 6).

That is, the structure of the lithium secondary battery of the present invention may be the optimal structure of the negative electrode in pre-lithiation.

Lithium Secondary Battery and Method of Manufacturing the Same

The negative electrode of the present invention may be usefully used for manufacturing lithium secondary batteries.

Specifically, the lithium secondary battery according to the present invention includes a negative electrode, a positive electrode positioned opposite to the negative electrode, a separator interposed between the negative electrode and the positive electrode, and an electrolyte, and here, the negative electrode is the above-described negative electrode of the present invention.

Meanwhile, the secondary battery may selectively further include a battery case (e.g., a pouch) accommodating an electrode assembly of the positive electrode, the negative electrode, and the separator, and a sealing member sealing the battery case.

The lithium secondary battery may be manufactured according to a conventional method of manufacturing a secondary battery, except that the negative electrode of the present invention is used.

In the secondary battery, the positive electrode includes a positive electrode current collector and a positive electrode active material layer positioned on at least one surface of the positive electrode current collector.

The positive electrode may be manufactured according to a conventional method of manufacturing a positive electrode generally known in the art. For example, the positive electrode may be manufactured by preparing a positive electrode mixture by dissolving or dispersing components constituting the positive electrode active material layer, that is, the positive electrode active material, a conductive material and/or a binder in a solvent, applying the positive electrode mixture on at least one surface of the positive electrode current collector, and then drying and pressing the resulting product, or casting the positive electrode mixture on a separate support and then laminating a film peeled from the support on the positive electrode current collector.

The positive electrode current collector is not particularly limited as long as it does not cause a chemical change in the battery and has conductivity, and may be, for example, stainless steel, aluminum, nickel, titanium, calcined carbon, or aluminum or stainless steel whose surface is treated with carbon, nickel, titanium, silver, or the like. In addition, the positive electrode current collector may generally have a thickness of 3 µm to 500 µm, and fine irregularities may be formed on the surface of the current collector, thereby increasing the adhesion with the positive electrode active material. For example, the positive electrode current collector may be used in various forms such as a film, a sheet, a foil, a net, a porous body, a foamed body, a nonwoven fabric, and the like.

Examples of the positive electrode active material may include layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ (where y is 0 to 0.33), $LiMnO_3$, $Li Mn_2O_3$, $LiMnO_2$, and the like; lithium copper oxide ($Li_2CuO_2$); vanadium oxides such as $LiMnO_3$, $LiFe_3O_4$, $V_2O_5$, $Cu_2V_2O_7$, and the like; Ni-site type lithium nickel oxides of Formula $LiNi_{1-y}M_yO_2$ (where M=Co, Mn, Al, Cu, Fe, Mg, B, or Ga, and y=0.01 to 0.3); lithium manganese composite oxides of Formula $LiMn_{2-y}M_yO_2$ (where M=Co, Ni, Fe, Cr, Zn, or Ta, and y=0.01 to 0.1), or Formula $Li_2Mn_3MO_8$ (where M=Fe, Co, Ni, Cu, or Zn); $LiMn_2O_4$ wherein a portion of Li is substituted with alkaline earth metal ions; disulfide compounds; $Fe_2(MoO_4)_3$, and the like, but the present invention is not limited thereto.

Further, the binder and the conductive material may be the same as described above for the negative electrode.

Meanwhile, in the secondary battery, the separator is not particularly limited as long as it is generally used in a secondary battery to separate a negative electrode from a positive electrode and provide a movement path for lithium ions, and particularly, it is preferable that the separator has low resistance to ion movement of an electrolyte and an excellent ability to be impregnated with an electrolyte solution. Specifically, a porous polymer film, for example, a porous polymer film formed of a polyolefin-based polymer such as an ethylene homopolymer, a propylene homopolymer, an ethylene/butene copolymer, an ethylene/hexene copolymer and an ethylene/methacrylate copolymer, or a stacked structure having two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

Meanwhile, an organic liquid electrolyte, an inorganic liquid electrolyte, a solid polymer electrolyte, a gel-type polymer electrolyte, a solid inorganic electrolyte, or a molten inorganic electrolyte, which may be used in manufacturing a secondary battery, may be used as the electrolyte, but the present invention is not limited thereto.

Specifically, the electrolyte may include an organic solvent and a lithium salt.

The organic solvent is not specifically limited so long as it functions as a medium through which ions involved in an electrochemical reaction of a battery can move. Specifically, the organic solvent may be an ester-based solvent such as methyl acetate, ethyl acetate, γ-butyrolactone, ε-caprolactone and the like; an ether-based solvent such as dibutyl ether, tetrahydrofuran or the like; a ketone-based solvent such as cyclohexanone; an aromatic hydrocarbon-based solvent such as benzene, fluorobenzene and the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC) and the like; an alcohol-based solvent such as ethyl alcohol, isopropyl alcohol and the like; nitriles such as Ra—CN (wherein Ra is a linear, branched or cyclic C2 to C20 hydrocarbon group and may include a double-bonded aromatic ring or ether bond); amides such as dimethylformamide; dioxolanes such as 1,3-dioxolane; or sulfolanes, and the like. Among these, a carbonate-based solvent is preferred, and a mixture of a cyclic carbonate having high ionic conductivity and a high dielectric constant, such as ethylene carbonate or propylene carbonate, which can increase the charge and discharge performance of the battery, and a linear carbonate-based compound with low viscosity (for example, ethyl methyl carbonate, dimethyl carbonate, diethyl carbonate, or the like) is more preferred. In this case, when a cyclic carbonate and a chain-type carbonate are mixed in a volume ratio of about 1:1 to about 1:9, the electrolyte solution may exhibit excellent performance.

The lithium salt may be used without particular limitation as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. A concentration of the lithium salt may be in a range of 0.1 M to 2.0 M. When the concentration of the lithium salt is in the above-described range, the electrolyte has suitable conductivity and viscosity and thus may exhibit excellent electrolyte performance, and the lithium ions may effectively move.

In order to improve the lifespan characteristics of the battery, inhibit a decrease in battery capacity, and improve the discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive may be included in an amount of 0.1 wt % to 5 wt % based on the total weight of the electrolyte.

Meanwhile, in the present invention, a lithium secondary battery may be manufactured using the pre-lithiated negative electrode of the present invention, but the lithium secondary battery may also be manufactured by performing pre-lithiation after the battery is assembled, by accommodating an electrode assembly including a negative electrode before pre-lithiation in a battery case, and then injecting an electrolyte solution into the battery case to impregnate the electrode assembly with the electrolyte solution.

The method of manufacturing the lithium secondary battery by first pre-lithiating the negative electrode includes the following operations:

forming a first negative electrode active material layer on a negative electrode current collector;

forming a lithium metal layer including lithium metal on the first negative electrode active material layer;

forming a second negative electrode active material layer on the lithium metal layer;

impregnating the resultant with a pre-lithiation solution so that pre-lithiation is achieved to manufacture a pre-lithiated negative electrode for a lithium secondary battery;

manufacturing an electrode assembly including the negative electrode, a positive electrode, and a separator, and accommodating the electrode assembly in a battery case; and injecting an electrolyte solution into the battery case.

The method of manufacturing the lithium secondary battery by performing pre-lithiation after the battery is assembled includes the following operations:

forming a first negative electrode active material layer on a negative electrode current collector;

forming a lithium metal layer including lithium metal on the first negative electrode active material layer;

forming a second negative electrode active material layer on the lithium metal layer to manufacture a negative electrode for a lithium secondary battery;

manufacturing an electrode assembly including the negative electrode, a positive electrode, and a separator, and accommodating the electrode assembly in a battery case; and injecting an electrolyte solution into the battery case and leaving the electrode assembly at a temperature of 10° C. to 200° C. for 2 hours to 48 hours so that the electrode assembly is impregnated with the electrolyte solution.

EXAMPLES

Hereinafter, the present invention will be described in detail with reference to examples. However, the following examples are intended to illustrate the present invention and are not intended to limit the present invention.

Example 1

Formation of First Negative Electrode Active Material Layer

A negative electrode active material slurry was prepared by adding 92 wt % of a negative electrode active material (graphite:SiO=7:3), 3 wt % of a conductive agent (Denka black), 3.5 wt % of a binder (styrene-butadiene rubber (SBR)), and 1.5 wt % of a thickener (carboxymethylcellulose (CMC)) to water. One surface of a copper current collector 130 was coated with the prepared negative electrode active material slurry, and dried and rolled to form a first negative electrode active material layer 112 in which a loading amount of the negative electrode active material is 2.6 mg/cm$^2$.

Formation of Lithium Metal Layer

A solution, in which lithium metal powder and a polyvinylidene fluoride (PVdF) binder are added to tetrahydrofuran (THF) at a weight ratio of 95:5 and dispersed, was evenly applied on the formed first negative electrode active material layer 112 and dried to form a lithium metal layer 120 in which a loading amount of lithium is 0.25 mg/cm$^2$.

Formation of Second Negative Electrode Active Material Layer

A negative electrode active material slurry was prepared by adding 92 wt % of a negative electrode active material (graphite:SiO=7:3), 3 wt % of a conductive agent (Denka black), and 5 wt % of a binder (PVdF) to THF. The slurry was uniformly applied on the formed lithium metal layer and then dried and rolled to form a second negative electrode active material layer 114 in which a loading amount of the negative electrode active material is 2.6 mg/cm$^2$ (see FIG. 1).

Pre-Lithiation

A pre-lithiation solution was prepared by dissolving 1M $LiPF_6$ in a solvent in which ethylene carbonate (EC) and diethyl carbonate (DEC) were mixed in a volume ratio of 50:50, and a structure (the structure in which a first negative electrode active material layer, a lithium metal layer, and a second negative electrode active material layer are sequentially formed on a current collector) manufactured above was impregnated with the solution and then allowed to stand at a temperature of 25° C.

Here, lithium ions from the lithium metal layer 120 are diffused into the first negative electrode active material layer 112 and the second negative electrode active material layer 114 to proceed pre-lithiation. After 3 hours, the electrode was taken out of the pre-lithiation solution, washed with DMC, and dried to manufacture a pre-lithiated negative electrode.

Manufacture of Lithium Secondary Battery

After the pre-lithiated negative electrode manufactured above was punched into a coin cell size, a polyolefin separator was interposed between a lithium metal foil as a counter electrode, and then an electrolyte solution in which 1M LiPF$_6$ was dissolved in a solvent in which EC and DEC were mixed at a volume ratio of 50:50 was injected to manufacture a coin-type half-cell.

Example 2

A pre-lithiated negative electrode and a lithium secondary battery using the same were manufactured in the same manner as in Example 1, except that when a lithium metal layer was formed, a lithium metal foil was placed on a first negative electrode active material layer and pressed instead of applying the lithium metal powder on the first negative electrode active material layer. The loading amount of the negative electrode active material and the loading amount of the lithium metal were equal to those in Example 1.

Comparative Example 1

A pre-lithiated negative electrode and a lithium secondary battery using the same were prepared in the same manner as in Example 1, except that a first negative electrode active material layer 12 and a second negative electrode active material layer 14 were sequentially formed on one surface of a copper current collector 30, and a lithium metal layer 20 was formed on the second negative electrode active material layer (see FIG. 2). The loading amount of the negative electrode active material and the loading amount of the lithium metal were equal to those in Example 1.

Comparative Example 2

A lithium secondary battery was manufactured in the same manner as in Example 1, except that a second negative electrode active material layer 14 was sequentially formed on the first negative electrode active material layer 12 without forming a lithium metal layer (see FIG. 3), and thus a pre-lithiation process was not performed. The loading amount of the negative electrode active material was equal to that in Example 1.

Comparative Example 3

Manufacture of Lithium Metal Layer

A solution, in which lithium metal powder and a PVdF binder are added to THF at a weight ratio of 95:5 and dispersed, was evenly applied on one surface of a copper current collector 30 and dried to form a lithium metal layer 20 on the copper current collector 30. The loading amount of the lithium metal was equal to that in Example 1.

Formation of Negative Electrode Active Material Layer

A negative electrode active material slurry was prepared by adding 92 wt % of a negative electrode active material (graphite: SiO=7:3), 3 wt % of a conductive agent (Denka black), and 5 wt % of a binder (PVdF) to THF. This slurry was uniformly applied on the formed lithium metal layer 20 and then dried and rolled to form a negative electrode active material layer 10 (see FIG. 4). The loading amount of the negative electrode active material was equal to the sum of the loading amounts of the negative electrode active materials used in the first negative electrode active material layer and the second negative electrode active material layer of Example 1.

Pre-Lithiation and Manufacture of Lithium Secondary Battery

A lithium secondary battery was manufactured in the same manner as in Example 1 using a pre-lithiated negative electrode (a two-layer structure in which a current collector, a lithium metal layer, and a negative electrode active material layer are sequentially stacked) manufactured by pre-lithiating the negative electrode, in which the negative electrode active material layer is formed, in the same manner as in Example 1.

Comparative Example 4

A pre-lithiated negative electrode (a three-layer structure in which a current collector/a lithium metal layer/a negative electrode active material layer/a lithium metal layer are sequentially stacked, see FIG. 5) and a lithium secondary battery were manufactured in the same manner as in Comparative Example 3, except that a lithium metal layer 22 and a negative electrode active material layer 10 were sequentially formed on a copper current collector 30 in the same manner as in Comparative Example 3, and then a lithium metal layer 24 was once again formed on the negative electrode active material layer 10 (performed by the same method as the method of forming the lithium metal layer on the current collector). The loading amount of the negative electrode active material and the loading amount of the lithium metal were equal to those in Example 1. Specifically, the loading amount of the negative electrode active material was equal to the sum of the loading amounts of the negative electrode active materials used in the first negative electrode active material layer and the second negative electrode active material layer, and the amount of lithium metal was made such that the sum of the lithium metal loading amounts of the two lithium metal layers 22 and 24 was equal to the loading amount of lithium of the lithium metal layer of Example 1.

Comparative Example 5

Formation of Lithium Metal Layer

A portion of one surface of a copper current collector 30 was masked, and a lithium layer 20 was formed on a portion of the copper current collector 30 by vacuum deposition with lithium metal as a target. The loading amount of the lithium metal was equal to that in Example 1.

Formation of Negative Electrode Active Material Layer

A negative electrode active material slurry was prepared by adding 92 wt % of a negative electrode active material (graphite:SiO=7:3), 3 wt % of a conductive agent (Denka black), and 5 wt % of a binder (PVdF) to THF. This slurry was uniformly applied on the formed lithium metal layer, and then dried and rolled to form a negative electrode active material layer 10 (see FIG. 6). The loading amount of the negative electrode active material was equal to that in Example 1.

The structure formed as described above is a structure in which a lithium layer is included in the negative electrode active material layer because the lithium metal layer is partially formed on the current collector.

Pre-Lithiation and Manufacture of Lithium Secondary Battery

A lithium secondary battery was manufactured in the same manner as in Example 1 using a pre-lithiated negative electrode manufactured by pre-lithiating the negative electrode, in which the negative electrode active material layer is formed, in the same manner as in Example 1.

Experimental Example 1. Initial Reversibility Test

The coin-type half cells manufactured in the Examples and Comparative Examples were subjected to a charge/ discharge reversibility test using an electrochemical charging and discharging device. Charging was performed by applying a current at a current density of 0.1C-rate up to a voltage of 0.005 V (vs. Li/Li$^+$), and discharging was performed at the same current density until a voltage of 1.5V. Here, the initial reversibility was confirmed by the ratio of the charging capacity to the discharging capacity, and the results of which are shown in Table 1 below.

TABLE 1

|  | Example 1 | Example 2 | Comparative Example 1 | Comparative Example 2 | Comparative Example 3 | Comparative Example 4 | Comparative Example 5 |
|---|---|---|---|---|---|---|---|
| Initial efficiency (%) | 99 | 97 | 92 | 80 | 86 | 87 | 85 |

In the case of Examples 1 and 2, since the lithium metal is present between the negative electrode active material layers to widen a contact area with the negative electrode active material, the lithium metal is sufficiently ionized and diffused into the negative electrode active material during pre-lithiation, so that all the lithium metal is used for pre-lithiation with little residual lithium metal, thereby improving the initial efficiency of the negative electrode.

On the other hand, in the case of Comparative Example 1, since the negative electrode active material is present only in a layer below the lithium metal layer, the contact surface between the negative electrode active material and the lithium metal is small, and thus the lithium metal is not all used in pre-lithiation and the lithium metal is left as unreacted lithium metal, and accordingly, pre-lithiation may not be sufficiently achieved, and thus the initial efficiency is not significantly improved.

In the case of Comparative Example 2, since the lithium metal layer was not included, pre-lithiation is not achieved, and thus the initial efficiency was very low.

In the case of Comparative Examples 3 to 5, since the negative electrode active material layer is not formed to surround the lithium metal layer above and below, pre-lithiation was not sufficiently achieved compared to the cases of Examples 1 and 2, and thus the initial efficiency was very low.

DESCRIPTION OF REFERENCE NUMERALS

10: negative electrode active material layer
12 and 112: first negative electrode active material layer
14 and 114: second negative electrode active material layer
20, 22, 24, and 120: lithium metal layer
30 and 130: negative electrode current collector

The invention claimed is:

1. A method for pre-lithiation of a negative electrode for a lithium secondary battery, the method comprising:
    forming a first negative electrode active material layer on a surface of a negative electrode current collector, wherein said first negative electrode active material layer comprises a silicon-based negative electrode active material and is selected from the group consisting of silicon, a silicon-based alloy, and SiO$_x$, wherein 0<x≤2;
    forming a lithium metal layer comprising a lithium metal on a surface of the first negative electrode active material layer;
    forming a second negative electrode active material layer on a surface of the lithium metal layer, wherein said second negative electrode active material layer comprises a silicon-based negative electrode active material and is selected from the group consisting of silicon, a silicon-based alloy, and SiO$_x$, wherein 0<x≤2, wherein said second negative electrode active material is the same or different from said first negative electrode active material; and
    impregnating the resulting negative electrode for the lithium secondary battery with a pre-lithiation solution to perform pre-lithiation, wherein the pre-lithiation solution comprises an ionizable lithium salt and an organic solvent, and the impregnation is performed at a temperature of 20° C. to 70° C. for 2 hours to 36 hours.

2. The method of claim 1, wherein the ionizable lithium salt contains Li+ as a cation, and an anion selected from the group consisting of F$^-$, Cl$^-$, Br$^-$, I$^-$, NO$_3^-$, N(CN)$_2^-$, BF$_4^-$, ClO$_4^-$, AlO$_4^-$, AlCl$_4^-$, PF$_6^-$, SbF$_6^-$, AsF$_6^-$, B$_{10}$Cl$_{10}^-$, BF$_2$C$_2$O$_4^-$, BC$_4$O$_8^-$, PF$_4$C$_2$O$_4^-$, PF$_2$C$_4$O$_8^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, C$_4$F$_9$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, CH$_3$SO$_3^-$, CF$_3$(CF$_2$)$_7$SO$_3^-$, CF$_3$CO$_2^-$, CH$_3$CO$_2^-$, SCN$^-$, and (CF$_3$CF$_2$SO$_2$)$_2$N$^-$; and
    wherein the organic solvent is one or more selected from the group consisting of a cyclic carbonate-based organic solvent, a linear carbonate-based organic solvent, and a linear ester-based organic solvent.

3. The method of claim 1, wherein the first negative electrode active material layer further comprises a carbon-based negative electrode active material, and a weight ratio of the silicon-based negative electrode active material to the carbon-based negative electrode active material in the first negative electrode active material layer is 1:99 to 50:50.

4. The method of claim 3, wherein the weight ratio of the silicon-based negative electrode active material to the carbon-based negative electrode active material is 5:95 to 20:80.

5. The method of claim 3, wherein the carbon-based negative electrode active material is selected from the group consisting of artificial graphite, natural graphite, graphitized carbon fiber, and amorphous carbon.

6. The method of claim 1, wherein the second negative electrode active material layer further comprises a carbon-based negative electrode active material, and a weight ratio of the silicon-based negative electrode active material to the carbon-based negative electrode active material in the second negative electrode active material layer is 1:99 to 50:50.

7. The method of claim 6, wherein the weight ratio of the silicon-based negative electrode active material to the carbon-based negative electrode active material is 5:95 to 20:80.

8. The method of claim 6, wherein the carbon-based negative electrode active material is selected from the group consisting of artificial graphite, natural graphite, graphitized carbon fiber, and amorphous carbon.

9. The method of claim 1, wherein the first negative electrode active material layer and the second negative electrode active material layer each further comprises a carbon-based negative electrode active material, and a weight ratio of the silicon-based negative electrode active material to the carbon-based negative electrode active material in each of the first negative electrode active material layer and the second negative electrode active material layer is 1:99 to 50:50.

10. The method of claim 1, wherein said forming of the lithium metal layer is by adding and dispersing a lithium metal powder and a binder in an organic solvent, and then evenly applying the solution onto the formed first negative electrode active material layer.

11. The method of claim 1, wherein said forming the lithium metal layer is by placing and pressing a lithium metal foil onto the formed first negative electrode active material layer.

\* \* \* \* \*